United States Patent
Guest et al.

(10) Patent No.: US 8,274,241 B2
(45) Date of Patent: Sep. 25, 2012

(54) LIGHT EMITTING DIODE LIGHTING DEVICE

(75) Inventors: Ralph E. Guest, Fortuna, CA (US); Jarl J. Johansen, Fortuna, CA (US)

(73) Assignee: C. Crane Company, Inc., Fortuna, CA (US)

( * ) Notice: Subject to any disclaimer, the term of this patent is extended or adjusted under 35 U.S.C. 154(b) by 368 days.

(21) Appl. No.: 12/365,862

(22) Filed: Feb. 4, 2009

(65) Prior Publication Data
US 2009/0195186 A1   Aug. 6, 2009

Related U.S. Application Data

(60) Provisional application No. 61/026,714, filed on Feb. 6, 2008.

(51) Int. Cl.
*F21V 29/02*      (2006.01)
*F21V 33/00*      (2006.01)

(52) U.S. Cl. ........... 315/294; 315/291; 362/294; 313/46

(58) Field of Classification Search ............... 315/294, 315/291; 362/85, 294, 373; D26/2; 313/11, 313/13, 46
See application file for complete search history.

(56) References Cited

U.S. PATENT DOCUMENTS

| | | | |
|---|---|---|---|
| D344,605 S | 2/1994 | Aspenwall | |
| 5,475,241 A | 12/1995 | Harrah et al. | |
| D434,175 S | 11/2000 | Fahmian | |
| 6,465,961 B1 * | 10/2002 | Cao | 315/58 |
| 6,601,976 B1 | 8/2003 | Rhee | |
| 6,659,632 B2 * | 12/2003 | Chen | 362/545 |
| D508,575 S | 8/2005 | Buschmann et al. | |
| 6,982,518 B2 * | 1/2006 | Chou et al. | 313/46 |
| 7,014,336 B1 | 3/2006 | Ducharme | |
| 7,038,399 B2 | 5/2006 | Lys et al. | |
| D528,227 S | 9/2006 | Chou et al. | |
| 7,102,902 B1 | 9/2006 | Brown et al. | |

(Continued)

FOREIGN PATENT DOCUMENTS

WO   WO/2009/100160   8/2009

OTHER PUBLICATIONS

Master Bond Polymer System EP30AN-1 Product Description [online], Mar. 23, 2006, [Retrieved on Mar. 5, 2009], Retrieved from the Internet: <URL: http://www.masterbond.com/tds/ep30an-1.html>.

(Continued)

*Primary Examiner* — Daniel D Chang
(74) *Attorney, Agent, or Firm* — Stolowitz Ford Cowger LLP

(57) ABSTRACT

A lighting device comprises a mounting head having multiple facets each configured to retain an associated Light Emitting Diode (LED). The LEDs are mounted to the facets with a thermally conductive metal pad and thermally conductive adhesive. A connector for the lighting device inserts into a light socket and receives power for operating the LEDs. A heat transfer body is coupled between the mounting head and the connector and transfer heat generated by the LEDs downward from the mounting head and then radially outward. The mounting head, adhesive, metal pad, and heat transfer body form a heat transfer structure that more effectively removes heat generated by the LEDs. In one embodiment, a dimmer circuit is also provided that allows the LED lighting device to operate with conventional dimmer switches.

13 Claims, 7 Drawing Sheets

U.S. PATENT DOCUMENTS

| | | |
|---|---|---|
| D531,741 S | 11/2006 | Takahashi |
| D534,665 S | 1/2007 | Egawa et al. |
| D538,953 S | 3/2007 | Mama |
| D541,440 S | 4/2007 | Feit |
| D545,477 S | 6/2007 | DeBruyne et al. |
| 7,255,457 B2 | 8/2007 | Ducharme |
| D553,267 S | 10/2007 | Yuen |
| 7,352,138 B2 | 4/2008 | Lys et al. |
| D572,400 S | 7/2008 | Benensohn |
| 7,396,146 B2 * | 7/2008 | Wang .......................... 362/294 |
| D584,444 S | 1/2009 | Lipson |
| D584,844 S | 1/2009 | Ghini |
| 7,494,241 B2 | 2/2009 | McCarthy et al. |
| D590,523 S | 4/2009 | Takahashi |
| 2003/0127994 A1 | 7/2003 | Patchornik et al. |
| 2004/0114367 A1 | 6/2004 | Li |
| 2005/0253533 A1 * | 11/2005 | Lys et al. ...................... 315/224 |
| 2007/0103086 A1 | 5/2007 | Neudorf |
| 2007/0127235 A1 | 6/2007 | Cooper et al. |
| 2007/0267984 A1 | 11/2007 | Peng |
| 2009/0175041 A1 | 7/2009 | Yuen |

OTHER PUBLICATIONS

Stolowitz Ford Cowger, Listing of Related Cases, May 26, 2011.
International Search Report for PCT/US2009/033118; Mailed Apr. 3, 2009.
Written Opinion of the International Searching Authority for PCT/US2009/033118; Mailed Apr. 3, 2009.
Stolowitz Ford Cowger LLP, Listing of Related Cases, Apr. 24, 2012.

* cited by examiner

LIGHT EMITTING DIODE LIGHTING DEVICE

This application claims priority from U.S. Provisional Application No. 61/026,714, filed Feb. 6, 2008, which is incorporated herein by reference.

BACKGROUND

Light Emitting Diodes (LEDs) can be more energy efficient than conventional incandescent lights and compact florescent lights. However, the LED lights output heat that can negatively affect performance, energy efficiency, and life expectancy. The LED lights can also be difficult to control with conventional light switches and can generate noise on power lines.

SUMMARY

A lighting device comprises a mounting head having multiple facets each configured to retain an associated Light Emitting Diode (LED). The LEDs are mounted to the facets with a thermally conductive metal pad and thermally conductive adhesive. A connector for the lighting device inserts into a light socket and receives power for operating the LEDs. A heat transfer body is coupled between the mounting head and the connector and transfers heat generated by the LEDs downward from the mounting head and then radially outward. The mounting head, adhesive, metal pad, and heat transfer body form a heat transfer structure that more effectively removes heat generated by the LEDs. A dimmer circuit is also provided that allows the LED lighting device to operate with conventional dimmer switches.

DETAILED DESCRIPTION

Heat Transfer Structure

Figure 1:
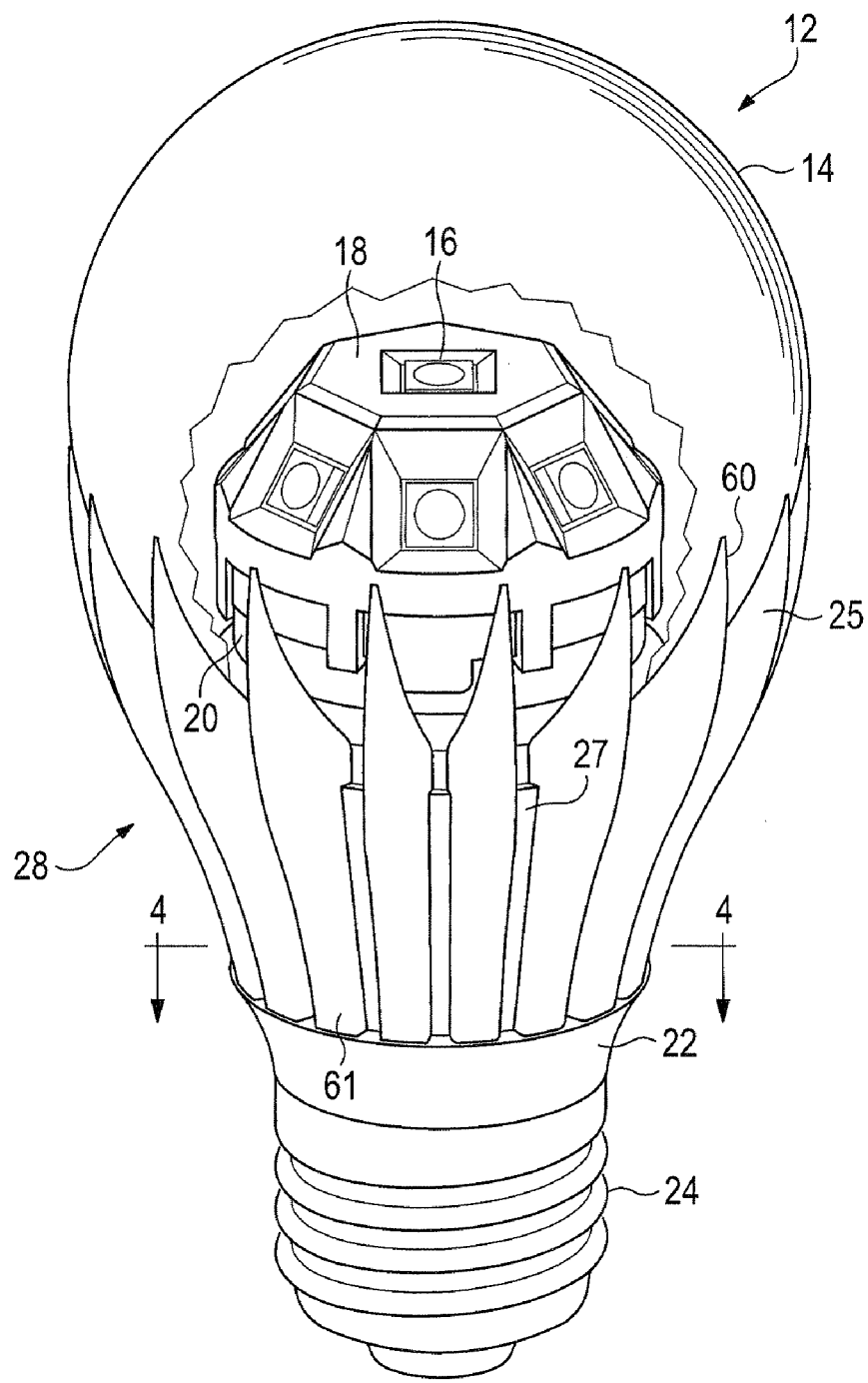
FIG. 1 is a perspective view of an energy efficient Light Emitting Diode (LED) lighting device.

FIG. 1 is a perspective view of a LED light bulb 12 that can replace standard incandescent and florescent lights. An array of LEDs 16 reside on an aluminum mounting head 18 and are aligned radially outward at inclining angles from a center axis of the LED light 12. An additional LED 16 is positioned horizontally upward on a top surface of the aluminum mounting head 18.

A glass or plastic bulb 14 is positioned over the LEDs 16 and attaches to the top of an aluminum heat transfer body 20. The heat transfer body 20 extends from the mounting head 18 down to an Edison style screw base connector 24. A plastic electric insulator 22 is attached between a bottom end of the heat transfer body 20 and a top end of the base connector 24. The base connector 24 screws into a conventional 120 volt alternating current (AC) light socket. Metal heat sink fingers 25 extend radially outward and upward from an outside surface of heat transfer body 20 and extend partially up the sides of the bulb 14. Lesser thermally conductive aluminum wedges 27 are inserted between adjacent heat sink fingers 25.

The LED bulb 12 can output light at the same levels as incandescent light bulbs while using less power. The LEDs 16 are more rugged than filaments or florescent tubes and can operate longer than incandescent and florescent lights. For example, one embodiment of the LED light 12 has a life expectancy of around 50,000 hours.

The unique arrangement, shape, and materials of the mounting head 18, heat transfer body 20, and heat sink fingers 25 are referred to generally as heat sink structure 28. The heat sink structure 28 more effectively transfers heat away from the LEDs 20 thus allowing the light bulb 12 to operate more efficiently by keeping the junction temperature of the LEDs 16 lower. The heat transfer structure 28 can alternatively be made out of other heat conductive materials other than aluminum, such as ceramic or other metals.

Figure 2:
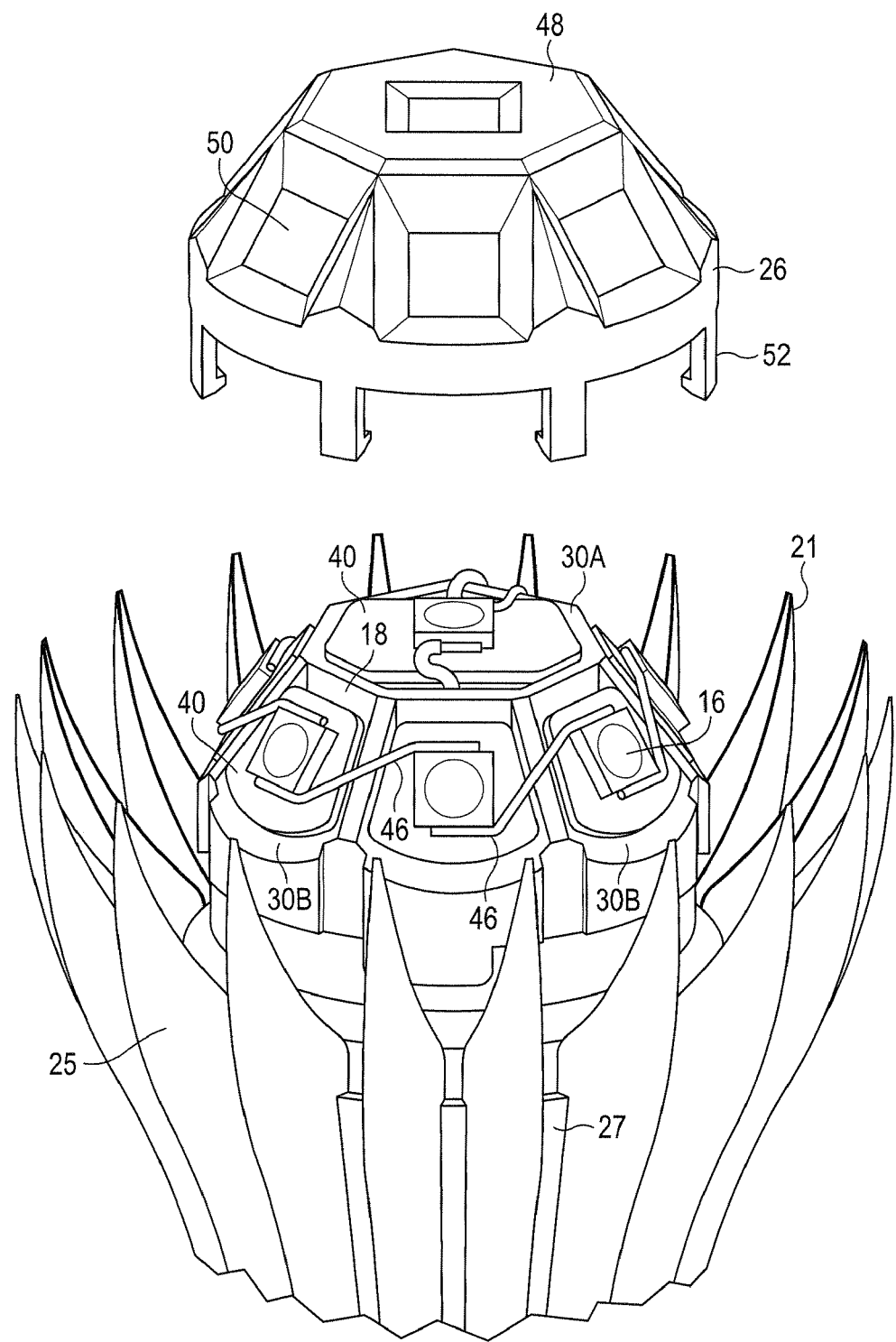
FIG. 2 is an exploded top view of the mounting head of the LED light.
Figure 3:
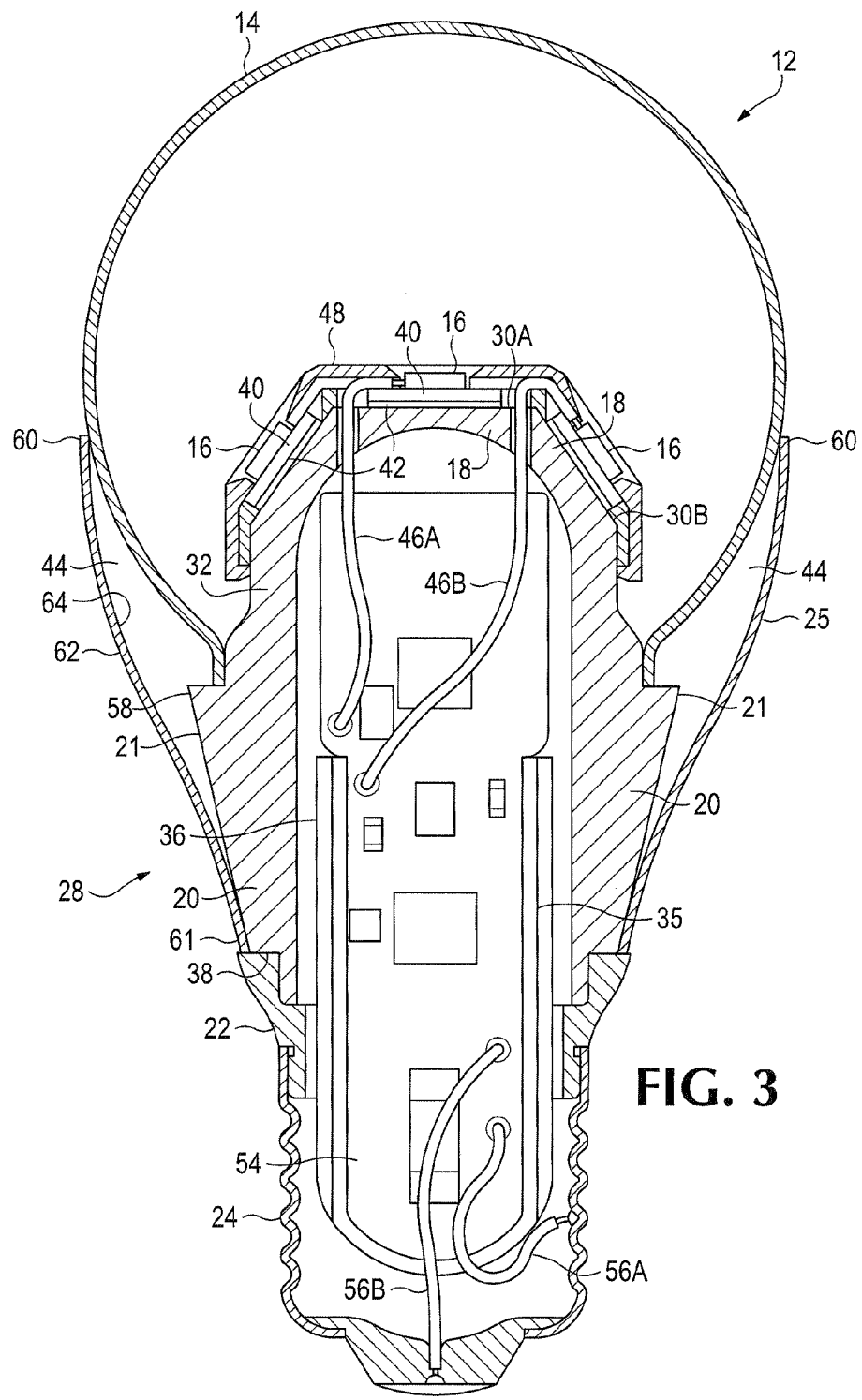
FIG. 3 is a side sectional view of the LED light.

FIGS. 2 and 3 show the improved heat sink structure 28 in more detail. The aluminum mounting base 18 includes a top horizontal surface 30A with outwardly angled sides 30B that extend radially outward around the top surface 30A. The top surface 30A and sides 30B are alternatively referred to as facets. A back side of each LED 16 is soldered to a separate thermally conductive metal pad 40. The metal pad 40 is then attached to an associated facet 30 with a thermally conductive adhesive 42.

The thermally conductive metal pad 40 can be made of copper or any other type of thermally conductive material. In one embodiment, the thermally conductive pads 40 are approximately 0.040 inches wide and 0.40 inches in height and approximately 1.02 millimeters thick. In one embodiment, the pads 40 have oppositely inclining lateral sides, a horizontal top side and a convex shaped bottom side.

The adhesive 42 is an electrical insulator with high thermal conductivity and low out gassing properties. The high thermal conductivity allow heat generated by the LEDs 16 to be readily transferred through the mounting head 18 to the heat transfer body 20 while also providing low out gassing that prevents discoloration of bulb 14. One type of thermally conductive adhesive 42 used for adhering the metal pad 40 to the facets 30 is a master bond polymer system EP30AN-1 made by Master Bond Inc., 154 Hobart Street, Hackensack, N.J. 07601.

The aluminum mounting head 18 is covered with a semi-transparent cap 48 that includes openings 50 for receiving the LEDs 16. The cap 48 includes latches 52 for locking against the sides of mounting head 18. Wires 46 connect the cathode/output of one LED 16 to the anode/input of an adjacent LED 16. In one embodiment, all of the LEDs 16 are connected together in series. However, the LEDs 16 could alternatively be connected together in parallel or in some other combination of series and parallel connections.

The seven side facets 30B each face upwardly at an angle of around 45 degrees. Each of the side facets 30B is also angled radially outward at an angle of approximately 51 degrees with respect to the two adjacent side facets 30B. The orientation of the side facets 30B allow each mounted LED 16 to radiate light and heat away from the other side LEDs 16 and also away from the top LED that resides on top facet 30A. Thus, the LEDs 16 receive a minimum amount of heat from other adjacent LEDs 16.

Referring more specifically to FIG. 3, the heat transfer body 20 operates as the core of the heat sink structure 28 and is an intergral extension of the same aluminum material that forms the mounting base 18. The heat transfer body 20 extends from the bottom of the mounting base down to the electric insulator 22. Thus a continuous aluminum heat transfer structure is provided from the top of the mounting head 18 down to the insulator 22. Ridges 21 extend radially outward from the outside surface of core 20 and thermally connect to the heat sink fingers 25.

A center cavity 36 in core 20 is formed to receive an electrical controller board 54. The controller board 54 inserts up into the bottom end of core 20 and includes a plastic outside shell 35 that engages with the inside surface 37 of center cavity 36.

A first wire 46A is coupled between a first one of the LEDs 16 and the controller board 54 and a second one of the wires 46B is coupled between a last one of the LEDs 16 and the controller board 54. Wire 56A is coupled between a ground connecting side of the base connector 24 and controller board 54 and a wire 56B is coupled between a power connecting end of the base connector 24 and controller board 54.

The heat transfer body 20 has a relatively large outside surface area that extends 360 degrees around the entire lower section of the LED light 12. The large outside surface area of heat transfer body 20 exposes more neat to the ambient air and thereby increases heat transfer away from the LEDs 16. When the heat sink fingers 25 are attached to the outside surface of heat transfer body 20, the overall surface area exposed to ambient air is further increased promoting even more heat transfer away from the LEDs 16.

Figure 4:
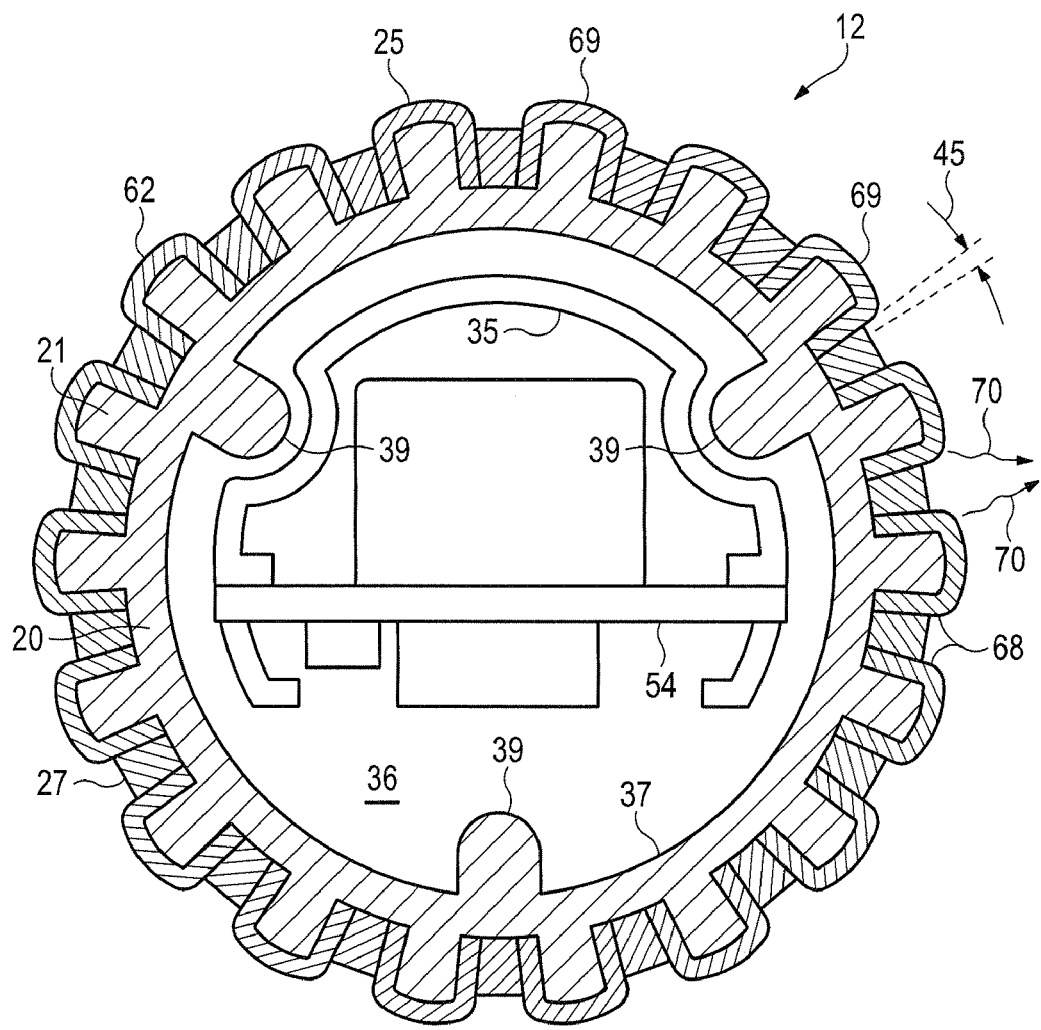
FIG. 4 is a top sectional view of the LED light.

FIG. 4 shows a plan sectional view of the LED light 12. Referring to FIGS. 1-4, an inside surface 31 of the cavity 36 contains lips 39 that extend radially inward toward the center of cavity 36. The lips 39 retain the shell 35 that attaches around the controller board 54.

The elongated ridges 21 extend around the entire outside surface of heat transfer body 20. The ridges 21 also extend lengthwise around two thirds of the way up the sides of heat transfer member 20 and are formed of the same integral piece of aluminum that forms the mounting head 18 and heat transfer body 20. Each heat sink finger 25 separately attaches around an associated one of the ridges 21. In one embodiment, the heat sink fingers 25 are made from separate pieces of a metal mesh that each have a continuous array of holes 62. The ridges 21 provide additional surface area on the outside surface of the heat transfer body 20 for transferring heat away from the LEDs 16. The ridges 21 also provide a large amount of contact area with the heat sink fingers 25 that promote additional heat transfer out away from the heat transfer body 20 to the heat sink fingers 25.

The fingers 25 have an arched outside face 69 with oppositely inclining sides 68 having an angle of around 20 degrees with respect to a hypothetical perpendicular line that extends from the surface of bulb 14. The heat sink fingers 25 nave a width at the base 61 of around 0.157 inches and a height of around 1.89 inches. Spacing between adjacent fingers at the base 61 is around 0.065 inches and spacing between adjacent fingers at the top 60 is around 0.285 inches. The fingers 25 fan out to a progressively wider circumference as they extend upward toward the bottom 61 to the top 60. The fingers 25 extend approximately $\frac{3}{5}^{th}$ of the way up the side of the bulb 14 to a vertical position aligning with approximately the center of the side LEDs 16.

The metal heat sink fingers 25 transfer heat radially outward and upward from the outside surface of the heat transfer body 20 and the connector 24. The fingers 25 also help transfer heat received from the LEDs 16 through the air inside the bulb 14.

This spacing between the fingers 25, the holes 62 in the metal fingers 25 and the internal cavities 44 inside of the fingers 25 above the ridges 21 provide a large amount of surface area for ambient air flow. The oppositely angled sides 68 and arched faces 69 of adjacent fingers 25 direct heat away from adjacent fingers and reduce the amount of heat 70 that a finger 25 may radiate directly onto the adjacent fingers 25.

The wedges 27 insert between the bottom halves of adjacent fingers 25 and extend vertically upward in parallel with the length of the ridges 21. The wedges 27 provide additional heat barriers between the adjacent fingers 25 further preventing the heat output by the fingers from radiating onto adjacent fingers.

Figure 5:
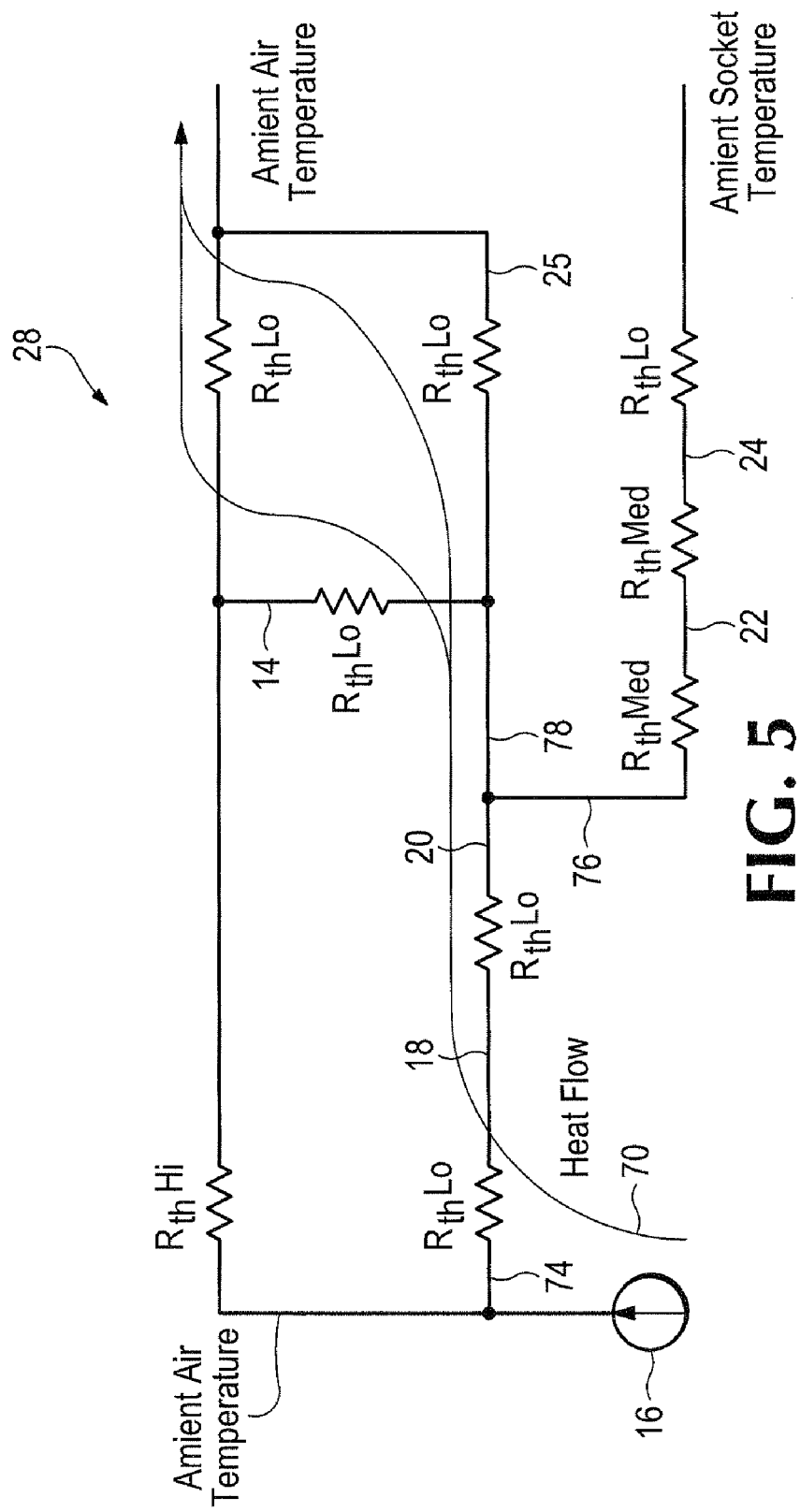
FIG. 5 is a schematic diagram showing heat transfer paths for the LED light.

FIG. 5 is a schematic diagram showing the thermal transfer paths provided by the heat sink structure 28 in the LED light 12. Heat needs to be removed from the LEDs 16 to extend operating life and to produce light rather than heat. The thermal resistance of air is relatively hi ($R_{th}$Hi) and therefore operates as a thermal insulator. However, components such as metal, glass, and ceramics have a relatively low thermal resistance ($R_{th}$Lo) and therefore operate as thermal conductors.

In order to increase the conventional heat transfer provided by ambient air, the LEDs 16 are soldered to the thermally conductive metal pad 40 that is then attached to the aluminum mounting head 18 with the thermally conductive adhesive 42. This provides a low resistance path 74 for heat 70 to flow from the LEDs 16, through the aluminum mounting head 18 and to the aluminum heat transfer body 20.

The heat transfer body 20 then provides several paths for heat 70 to travel further away from the LEDs 16. Heat transfer path 76 goes from the heat transfer body 20 to insulator 22 and base connector 24. Some heat is transferred to the screw base connector 24 and consequentially to the light fixture and wiring.

Another heat transfer path 78 goes from the heat transfer body 20 to the heat sink fingers 25. As explained above, the heat sink fingers 25 also receive some of the heat that radiates from the LEDs 16 through the air inside of bulb 14. The fingers 25 further promote transfer of this heat away from the outside surface of bulb 14.

The combination of the thermally conductive metal pad 40, thermally conductive adhesive 42, thermally conductive mounting head 18, thermally conductive heat transfer body 20, and thermally conductive metal heat sink fingers 25 provide an improved and more effective structure for transferring heat away from the LEDs 16.

Electrical Control

Figure 6:
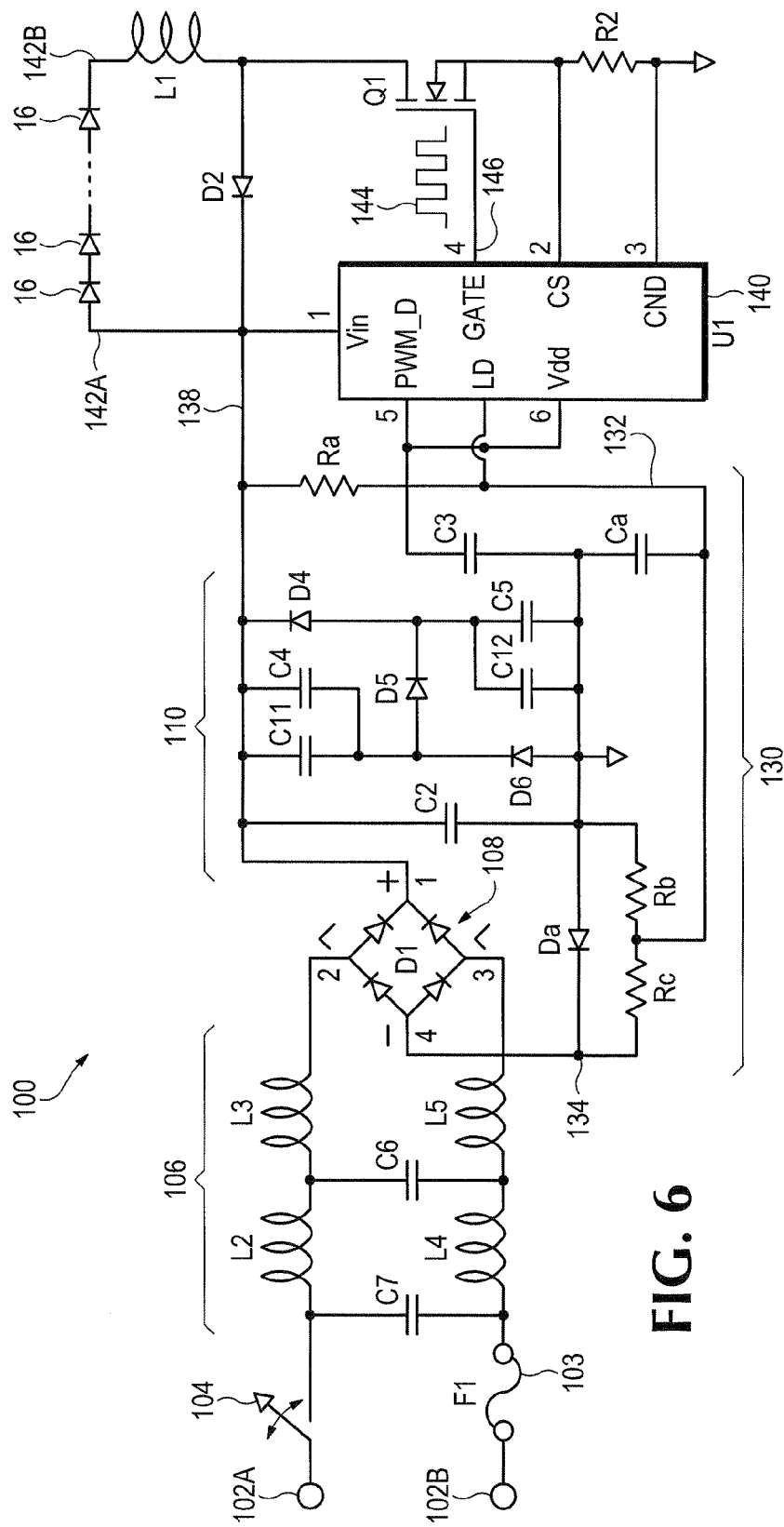
FIG. 6 is a schematic diagram for control circuitry used in the LED light.
Figure 7A:
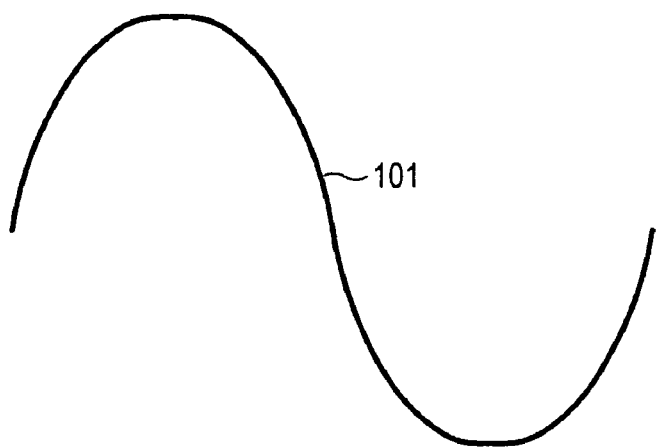
FIGS. 7A-7C show signals received and generated by the control circuitry in FIG. 6.

FIG. 6 shows a control circuit 100 used for operating the LEDs 16. Terminals 102A and 102B are connected to a standard Edison style connector 24 as previously shown in FIG. 1. The terminals 102 receive AC power 101 as shown in FIG. 7A. A slow-blow fuse 103 blows before tripping a home circuit breaker. A dimmer switch 104 varies the AC voltage level fed into the control circuit 100.

A filter circuit 106 includes a capacitor C7, and two inductors L2 and L4. The filter formed by C7, L2, and L4 is repeated again with components C6, L3, and L5 to form a four pole filter. Filter circuit 106 works in both directions, preventing noise on the AC voltage source 101 from interfering with the operation of control circuit 100 and also preventing noise created by the control circuit 100 from going back out on the input voltage source 101.

Figure 7B:
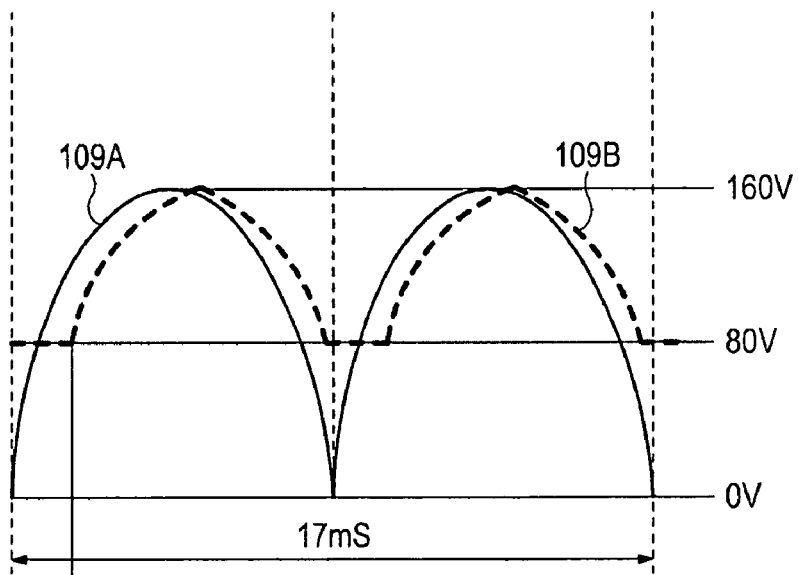

A full wave bridge rectifier 108 converts the input voltage 101 (±160V) into a 160 volt DC voltage 109A as also shown in FIG. 7B. The voltage 109A is now floating. The voltage 109A goes into a power conditioning circuit 110 consisting of capacitors C2, C3, C4, C5, C11, and C12 and diodes D4, D5, and D6. Power conditioning circuit 110 increases energy efficiency by reducing the input voltage by half and adjusting the phase of the power signal to increase the power factor efficiency of control circuit 100. The capacitors C11, C4 and C12, C5 in circuit 110 are charged to the peak voltage of 160 volts. Each set of capacitors is charged to 80 volts, since the two capacitor pairs are in series.

Figure 7C:
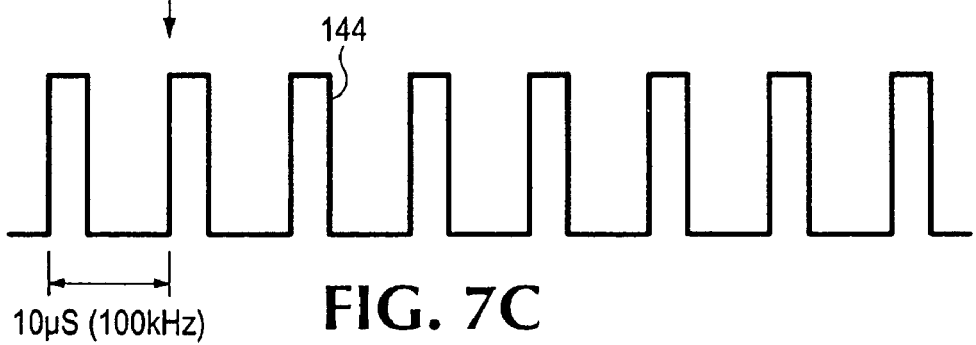

The control Integrated Circuit (IC) 140 generates pulses 144 as shown in FIG. 7C. In one embodiment, the IC 140 is a HV9910 Universal High Brightness LED driver manufactured by Supertex, Inc, 1235 Bordeaux Drive, Sunnyvale, Calif. 94089. The operation of the control IC 140 is known to those skilled in the art.

The duty cycle of the pulses 144 output from the gate 146 of IC 140 are controlled according to the voltage level on a Light Dimming (LD) input 132. The pulses 144 activate a Field Effect Transistor (FET) Q1 allowing current to flow through an inductor L1 and activate LEDs 16. A current sense pin CS on IC 140 is used to sense the current flowing through the transistor Q1 by means of external sense resistor R2.

When the voltage on the CS pin exceeds the lower of either an internal voltage set in the IC 140 (typically 250 milli-volts) or the voltage at the LD input 132, the output of the gate pin 146 goes low. When the transistor Q1 turns on, the current through the inductor L1 starts ramping up. This current flows through the external sense resistor R2 and produces a ramp voltage at the CS pin. Comparators in the IC 140 constantly compare the CS pin voltage to both the voltage at the LD input 132 and the internal voltage reference. When the voltage on the CS pin exceeds the voltage on LD pin 132, an output of the internal comparators reset an internal Set-Reset (SR) flip-flop and drive the gate pin 146 low. The gate pin 146 goes low until the S-R flip-flop is reset by an internal oscillator.

Dimmer

Dimmer switches are generally designed to operate with incandescent light bulbs which are basically hot resistors and do not typically work with high efficiency LED light bulbs. Most dimmer switches only reduce the input voltage down to around 20% of the main line voltage 101. However, the conventional control circuitry that operates LED lights still operates relatively well at 20% of the input voltage 101. Thus, LED light bulbs will not turn off or dim like an incandescent light bulb when a conventional dimmer switch, such as dimmer switch 104, is used for reducing the input voltage 101.

Dimmer circuitry 130 includes resistor Ra and capacitor Ca that together provide a slow delayed power signal to the LD input 132 of the IC 140. This delayed input signal 132 corrects phase differences between the voltage and current of the power signal and thus improves the power factor of the LED bulb 12. This is shown in FIGS. 7A-7C where the phase of voltage 109A is delayed to voltage 109B. This delay causes the IC 140 to delay the generation of pulses 144 making the control circuit 100 look more inductive and in turn increase the overall power factor.

To enable light dimming, the parallel combination of resistors Rb and Rc divide the voltage down from Ra. Diode Da creates a negative 0.7 voltage that compensates for the minimum 20% positive voltage produced by some dimmer switches 104.

To explain in more detail, the voltage level on the LD input 132 determines how much current is allowed to flow through the LEDs 16. For example, increasing the voltage on the LD input 132 increases the duty cycle of the pulses 144. This allows more current to flow through the LEDs 16 and in turn generates more light.

The diode Da generates a negative voltage that is then divided by resistors Rb and Rc generating a negative voltage offset that further reduces the voltage at the LD input 132. As the AC input voltage 101 is reduced by dimmer switch 104, the voltage at LD input 132 is eventually pulled down to substantially zero volts due to the negative voltage across diode Da.

This negative diode voltage allows a conventional dimmer switch 104 to slowly reduce the voltage on the LD input 132 down to zero volts. The reduced voltage on the LD input 132 causes the IC 140 to dim the LEDs 116 by continuously reducing the duration/duty cycle of the pulses 144 output on the gate pin 146. As the dimmer switch 104 continues to reduce voltage 101, the voltage on LD pin 132 eventually reduces down to zero causing the IC 140 to substantially narrow or disable pulses 144 so that the LEDs 16 remain off.

All of the signals are complex waveforms and can vary depending on the type dimmer switch 104. However, these waveforms all get averaged by capacitor Ca at the LD input 132. Thus, the LED light bulb 12 can operate universally with various types of dimmer switches 104.

Thus, the heat sink structure 28 described above in FIGS. 1-5 in combination with the control circuitry 100 described above in FIGS. 6 and 7 provide a more energy efficient LED lighting device with an extended operating life that can also be controlled using conventional dimming switches.

The system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries in any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. We/I claim all modifications and variation coming within the spirit and scope of the following claims.

The invention claimed is:

1. A lighting device, comprising:
    a mounting head having multiple facets each configured to retain an associated Light Emitting Diode (LED), the facets having upwardly inclining angles that extend radially outward;
    a light cover extending over the mounting head;
    a connector configured to insert into a light socket and receive power for operating to the LEDs; and
    a heat sink body located between the mounting head and the connector configured to sink heat generated by the LEDs downward and outward from the mounting head, wherein the heat sink body is formed from one continuous piece of material with the mounting head and includes an elongated lower section having a solid internal body and a continuous outside surface that extends between and around a bottom end of the light cover and a top end of the connector.

2. The lighting device according to claim 1 wherein the lower section of the heat sink body is formed with an upper section that extends down from the mounting head and out through the bottom end of the light cover.

3. The lighting device according to claim 1 including elongated ridges formed with the lower section of the heat sink body and extending along substantially an entire vertical length of the outside surface of the lower section of the heat sink body.

4. The lighting device according to claim 3 wherein the ridges are configured to promote heat transfer downward from the mounting head, through the heat sink body, and radially outward from around the entire outside surface of the lower section of the heat sink body.

5. The lighting device according to claim 1 further comprising multiple individually foamed metal thermal transfer pads individually and separately coupled between the facets and the associated LEDs.

6. The lighting device according to claim 5 further comprising a thermally conductive adhesive configured to provide a thermally conductive path between the metal thermal transfer pads and the facets.

7. The lighting device according to claim 6 wherein the thermally conductive adhesive is glue with high thermal conductivity, high electrical insulation, and low out gassing.

8. The lighting device according to claim 1 wherein the light cover is configured to mount onto a top end of the lower section of the heat sink body.

9. A Light Emitting Diode (LED) lighting device, comprising:
   a mounting head configured to hold LEDs;
   a cover configured to extend over the LEDs; and
   a continuous solid heat sink body comprising a top portion forming the mounting head and a bottom portion extending down from the mounting head and out through a bottom end of the cover, wherein the heat sink body comprises a same continuous unitary piece of material forming the bottom portion and the top portion and wherein the bottom portion has a continuous outside surface that extends below a bottom end of the cover and above a top end of a connector.

10. The lighting device according to claim 9 further comprising elongated ridges that extend vertically along substantially an entire vertical height of the bottom portion of the heat sink body and are formed from the same continuous unitary piece of material forming the bottom portion and the top portion and extend radially around the outside surface of the bottom portion of the heat sink body.

11. The lighting device according to claim 9 wherein the mounting head and the heat sink body are formed together from a same unitary piece of aluminum and a thermally conductive adhesive is used to attach the LEDs to the mounting head.

12. A Light Emitting Diode (LED) lighting device, comprising:
   a mounting head configured to hold multiple LEDs;
   a cover configured to cover the LEDs;
   a heat sink body formed from a same continuous piece of material used for the mounting head and extending down through and out of the cover to a connector, the heat sink body including a bottom portion that extends below and around a bottom end of the cover and sits above and on top of the connector; and
   elongated fins extending vertically along the bottom portion of the heat sink body and formed from the same continuous piece of material used for the mounting head and heat sink body and extending radially around an outside surface of the bottom portion of the heat sink body.

13. The lighting device according to claim 12 wherein the cover is configured to mount onto a top end of the bottom portion of the heat sink body.

* * * * *

UNITED STATES PATENT AND TRADEMARK OFFICE
CERTIFICATE OF CORRECTION

PATENT NO. : 8,274,241 B2
APPLICATION NO. : 12/365862
DATED : September 25, 2012
INVENTOR(S) : Guest et al.

Page 1 of 1

It is certified that error appears in the above-identified patent and that said Letters Patent is hereby corrected as shown below:

In the Claims:

Column 7, line 20, claim 5, delete "foamed" and replace with --formed--, therefor.

Signed and Sealed this
Second Day of July, 2013

Teresa Stanek Rea
*Acting Director of the United States Patent and Trademark Office*